United States Patent
Le Van Gong et al.

(10) Patent No.: US 7,784,085 B2
(45) Date of Patent: Aug. 24, 2010

(54) ENABLING IDENTITY INFORMATION EXCHANGE BETWEEN CIRCLES OF TRUST

(75) Inventors: Hubert A. Le Van Gong, San Jose, CA (US); Eve Maler, Kirkland, WA (US); Rajeev Angal, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 1161 days.

(21) Appl. No.: 11/297,215

(22) Filed: Dec. 8, 2005

(65) Prior Publication Data

US 2007/0136786 A1   Jun. 14, 2007

(51) Int. Cl.
*G06F 9/00* (2006.01)
*H04L 29/06* (2006.01)

(52) U.S. Cl. .......................................... 726/3; 713/155
(58) Field of Classification Search ............... 726/3; 713/155

See application file for complete search history.

(56) References Cited

U.S. PATENT DOCUMENTS

2006/0053296 A1 * 3/2006 Busboom et al. ............ 713/182
2006/0155993 A1 * 7/2006 Busboon ..................... 713/169

* cited by examiner

*Primary Examiner*—Nasser Moazzami
*Assistant Examiner*—Mohammad W Reza
(74) *Attorney, Agent, or Firm*—Osha • Liang LLP

(57) ABSTRACT

A system for identifying a principal consisting of a service provider in a first circle of trust, where the first circle of trust is implemented using a first architecture; a first identity provider operatively connected to the service provider in the first circle of trust; and a second identity provider in a second circle of trust, where the second circle of trust is implemented using a second architecture, where the first identity provider is configured to contact the second identity provider, in compliance with the second architecture, as a virtual service provider in the second circle of trust to obtain identity information associated with the principal thereby allowing the first identity provider to identify the principal in the first circle of trust.

16 Claims, 6 Drawing Sheets

ENABLING IDENTITY INFORMATION EXCHANGE BETWEEN CIRCLES OF TRUST

BACKGROUND

Identity is the most basic element in a high-value relationship with customers, employees, citizens, or business partners. It has to be managed with great care to proactively fight fraud and identity theft. In the online world, many services require a principal, such as a human operator or a computer entity (e.g., web service client), to supply some credentials (e.g., a principal name and password) in order to be identified. As the principal navigates from site to site, this process repeats itself over and over forcing the principal to re-submit its credentials. Even in the case of a single corporation, if the principal is navigating from one department website to another department website, the principal may be required to re-supply its credentials frequently.

In any client/server relationship, single sign-on (SSO) is an authentication process that permits a principal to supply credentials only once in order to access multiple applications or resources. SSO, which is requested when the principal initially requests access to an application, authenticates the principal and/or authorizes the principal to access multiple applications to which the principal is entitled, and eliminates future authentication prompts when the principal switches applications during that particular session, unless stronger or different credential-checking is required.

The Liberty Alliance Project (a trademark of Sun Microsystems, Inc., a Mountain View, Calif. Company) co-founded by Sun Microsystems, Inc. is a set of protocols and guidelines for a SSO environment that uses the idea of "federation". Federation is the act of establishing a relationship between two entities (e.g., a relationship between a Service Provider and an Identity Provider). This relationship may be a business relationship, such as a contract, or an operational agreement, or some other type of trust relationship that forms the basis for SSO to exist in the first place. The Liberty Alliance Project uses federation to implement scalable, efficient, user-friendly cross-domain identity management on a network.

A circle of trust is a group of service providers and at least one identity provider that have a trust relationship and with which principals can transact business in a secure and apparently seamless manner. Service providers and identity providers within a circle of trust may implement one of a variety of architectures for federation, including Liberty developed in part by Sun Microsystems, Inc. or WS-Federation developed in part by the Microsoft Corporation. In general, circles of trust implemented with different architectures for federation are not compatible. Therefore, a principal identified in a particular circle of trust may not have its identity information shared with another circle of trust, if the two circles of trust are implemented using different federation architectures. Thus, if the principal attempts to request a service from a service provider that is not in the circle of trust in which the principal has been identified, then the principal may need to re-supply credentials in order to be identified in the new circle of trust. Identity information may include proof of the principal's identity, profile attributes associated with the principal, and access rights.

SUMMARY

In general, in one aspect, the invention relates to a system for identifying a principal comprising a service provider in a first circle of trust, wherein the first circle of trust is implemented using a first architecture, a first identity provider operatively connected to the service provider in the first circle of trust, and a second identity provider in a second circle of trust, wherein the second circle of trust is implemented using a second architecture, wherein the first identity provider is configured to contact the second identity provider, in compliance with the second architecture, as a virtual service provider in the second circle of trust to obtain identity information associated with the principal thereby allowing the first identity provider to identify the principal in the first circle of trust.

In general, in one aspect, the invention relates to a method for identifying a principal comprising requesting identity information associated with the principal from a first identity provider in a first circle of trust, wherein the first circle of trust is implemented using a first architecture, translating the request for identity information to be in compliance with a second architecture, requesting identity information associated with the principal from a second identity provider in a second circle of trust using the translated identity information request, wherein the second circle of trust is implemented with the second architecture, providing identity information associated with the principal to the first identity provider, wherein the identity information is provided by the second identity provider, and providing the identity information associated with the principal, wherein the principal uses the identity information to access a service provider in the second circle of trust.

In general, in one aspect, the invention relates to a system for identifying a principal comprising a first identity provider in a first circle of trust, wherein the first circle of trust is implemented using a first architecture, a second identity provider in a second circle of trust, wherein the second circle of trust is implemented using a second architecture, and a service provider in the second circle of trust, wherein the first identity provider is configured to contact the second identity provider, in compliance with the second architecture, as a virtual service provider in the second circle of trust to obtain identity information associated with the principal, wherein the identity information will be used by the principal to access the service provider in the second circle of trust.

Other aspects of the invention will be apparent from the following description and the appended claims.

DETAILED DESCRIPTION

Figure 1:
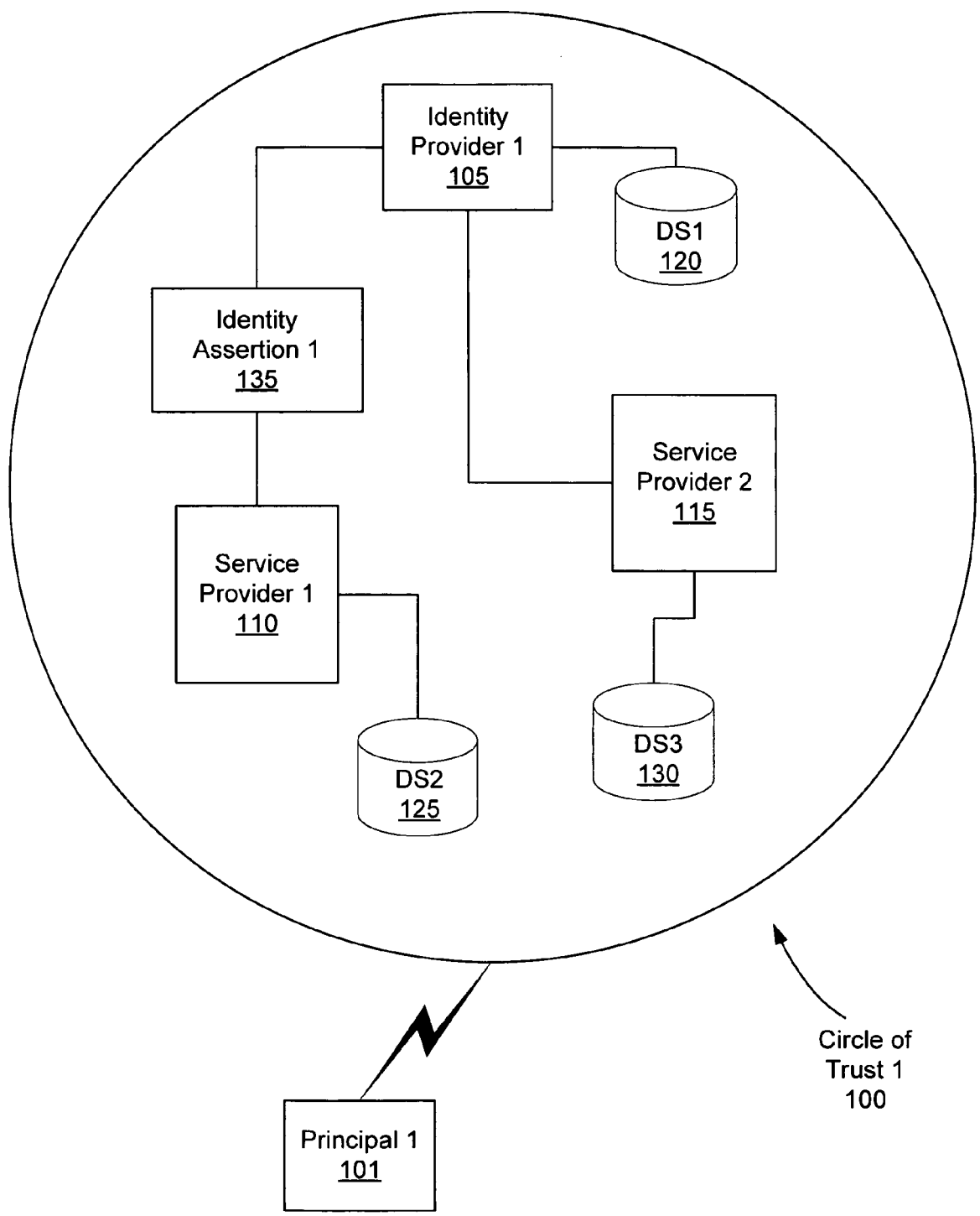
FIG. 1 shows a diagram of a typical circle of trust implemented with a SSO architecture.

Exemplary embodiments of the invention will be described with reference to the accompanying drawings. Like items in the drawings are denoted by the same reference numbers throughout the figures for consistency.

In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to a method for identifying a principal in a first circle of trust. More specifically, embodiments of the invention relate to identifying a principal in a first circle of trust using an identity provider in a second circle of trust. Identity information may include proof of the principal's identity, profile attributes associated with the principal, and access rights.

FIG. 1 shows a typical circle of trust implemented using a SSO architecture. As shown in FIG. 1, Circle of Trust 1 (100) includes (Identity Provider 1 (105) and several service providers (e.g., Service Provider 1 (110), Service Provider 2 (115), etc.). Identity Provider 1 (105), Service Provider 1 (110) and Service Provider 2 (115) may be separate systems connected through a local area network, or through a large area network such as the Internet. Service Provider 1 (110) and Service Provider 2 (115) may, for example, be web servers running web sites on the Internet. Identity Provider 1 (105) is responsible for identifying principals within Circle of Trust 1 (100). Principal 1 (101) is a principal that wishes to be identified in Circle of Trust 1 (100). In some implementations, an identity provider is a service provider that has the extra responsibility of identifying principals in a circle of trust. Alternatively, the identity provider may correspond to a server configured to perform only principal identification. Those skilled in the art will appreciate at least one service provider and at least one identity provider are required to form a circle of trust. Identity Provider 1 (105), Service Provider 1 (110) and Service Provider 2 (115) may each have a corresponding data store (i.e., DS1 (120), DS2 (125), DS3 (130), respectively) to store principal profiles. Identity Provider 1 (105), Service Provider 1 (110) and Service Provider 2 (115) have a business relationship that allows Circle of Trust 1 (100) to exist. For example, Service Provider 1 (110) and Service Provider 2 (115) may correspond to different commercial airline carriers and Identity Provider 1 (105) may be used by Service Provider 1 (110) and Service Provider 2 (115) for principal identification.

The following is a brief description of how a principal is typically identified in the circle of trust. For the purposes of this example, Principal 1 (101) may be a human operator with a personal computer, a web-browser, a PDA, a mobile phone, or any other electronic device capable of communicating with Identity Provider 1 (105), Service Provider 1 (110) and Service Provider 2 (115). Alternatively, Principal 1 (101) may correspond to another machine or system, for example, a web service client associated with identification credentials. Initially, the principal is outside Circle of Trust 1 (100). When Principal 1 (101) attempts to use Service Provider 1 (110) located within Circle of Trust 1 (100), Principal 1 (101) must first be identified. Service Provider 1 (110), upon receiving a request from Principal 1 (101) to use a service provided by Service Provider 1 (110), contacts Identity Provider 1 (105) to determine if Principal 1 (101) has been identified. If the principal has not been identified, Service Provider 1 (110) directs the principal to Identity Provider 1 (105) for authentication. The authentication process may correspond to any process that may be used to identify the principal. If the login is successful, Identity Provider 1 (105) generates an identity assertion (i.e., Identity Assertion 1 (135)) and subsequently sends Identity Assertion 1 (135) to Service Provider 1 (110). Principal 1 (101) may now use the services of Service Provider 1 (110). Identity Assertion 1 (135) typically corresponds to a confirmation from Identity Provider 1 (105) that Principal 1 (101) has been successfully identified. Identity Assertion 1 (135) may be, for example, a signed XML block or an encrypted packet Service Provider 1 (110) unlocks with a private key. Those skilled in the art will appreciate that the identity assertion may correspond to any information that may be used to identify the principal. In some cases, the identity assertion may also include information necessary to authenticate the user (e.g., passwords, etc.).

If Principal 1 (101) then attempts to use Service Provider 2 (115) located within Circle of Trust 1 (100), like before, Principal 1 (101) will have to be identified. Service Provider 2 (115) will contact Identity Provider 1 (105) to determine if Principal 1 (101) has been identified. Since Principal 1 (101) has been identified, there is no need for Principal 1 (101) to re-login. Instead, Identity Provider 1 (105) will generate an identity assertion (not shown) for Service Provider 2 (115), which may be used by Service Provider 2 (115) as confirmation that Principal 1 (101) has been identified.

Typically, a principal may have distinct profiles (i.e., a different profile with each service provider). For example, still referring to FIG. 1, Principal 1 (101) is "Joe Smith". Principal 1 (101) may be known as "Joe" on Service Provider 1 (110), "Smith" on Service Provider 2 (115), and "JS" on the Identity Provider 1 (105). In such situations, the identity assertion confirms that the principal has been identified. In the typical implementation, a principal's profile on one service provider is kept hidden from other service providers.

Service providers and identity providers within a circle of trust may implement any appropriate architecture for federation. Examples of such architectures include ID-FF developed as part of the Liberty Alliance Project™, and WS-Federation developed jointly by several companies headed by the Microsoft Corporation. In general, different architectures are not compatible. Therefore, a principal identified in a circle of trust may not have his identity information shared with other circles of trust. Thus, if a principal attempts to request a service from a service provider that is not in the circle of trust for which the principal has been identified, then the principal must re-supply credential information in order to be identified in the new circle of trust.

Figure 2:
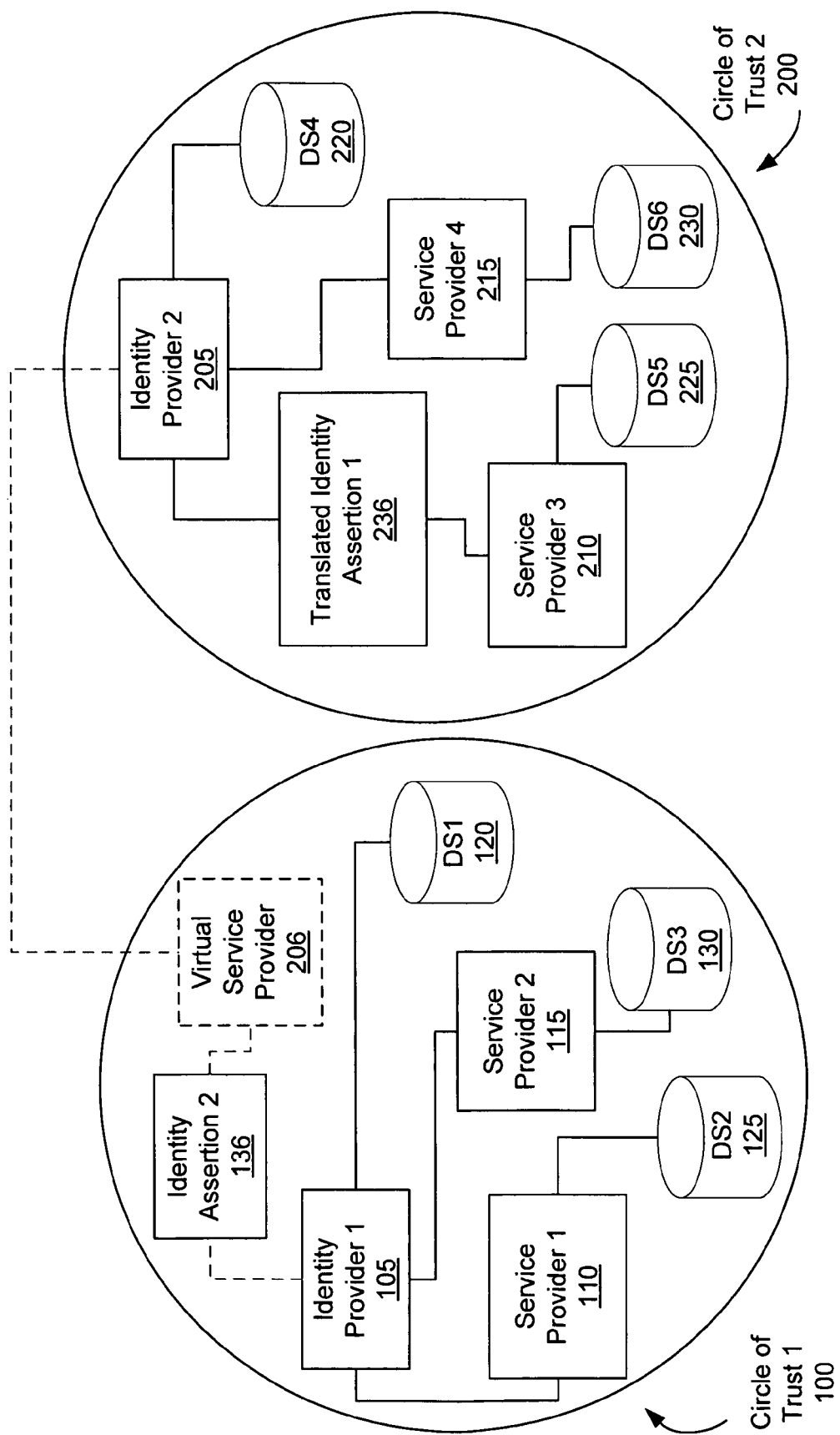
FIG. 2 shows a diagram of two circles of trust in accordance with one embodiment of the invention.

FIG. 2 shows two circles of trust in accordance with one or more embodiments of the invention. Circle of Trust 1 (100) is the same as shown and described in relation to FIG. 1. Circle of Trust 2 (200) includes an identity provider (Identity Provider 2 (205)) and several service providers (i.e., Service Provider 3 (210), Service Provider 4 (215)). Identity Provider 2 (205), Service Provider 3 (210) and Service Provider 4 (215) may each have a corresponding data store (i.e., DS4 (220), DS5 (225), DS6 (230), respectively) to store principal profiles. Circle of Trust 1 (100) and Circle of Trust 2 (200) may implement different architectures for federation that are not compatible, or different versions of the same architecture that may not be compatible.

If the principal (not shown) is identified in Circle of Trust 1 (100) and navigates to Service Provider 3 (210) in Circle of Trust 2 (200), Service Provider 3 (210) will direct the principal to Identity Provider 2 (205) for identification. Because the principal may not be identified in Circle of Trust 2 (200), the Identity Provider 2 (205) may contact Identity Provider 1 (105) in Circle of Trust 1 (100) to identify the principal.

In one embodiment of the invention, Identity Provider 2 (205) in Circle of Trust 2 (200) appears as a virtual service provider (i.e., Virtual Service Provider (206)) to Identity Provider 1 (105) in Circle of Trust 1 (100). For example, in FIG. 2, the Virtual Service Provider (206) may contact Identity Provider 1 (105) in a manner compliant with the architecture of Circle of Trust 1 (100). As the principal is identified in Circle of Trust 1 (100), Identity Provider 1 (105) generates an identity assertion (i.e., Identity Assertion 2 (136)) and sends it to the Virtual Service Provider (206). The Virtual Service Provider (206) translates Identity Assertion 2 (136) into a translated identity assertion (i.e., Translated Identity Assertion 1 (236)) appropriate for Service Provider 3 (210) in Circle of Trust 2 (200). In one embodiment of the invention, the translated identity assertion corresponds to an identity assertion in a protocol that is compliant with the federation architecture used by the particular circle of trust. Those skilled in the art will appreciate that if Circle of Trust 1 (100) and Circle of Trust 2 (200) implement the same architecture for federation, translation of the Identity Assertion 2(136) may be avoided. Therefore, identity providers may have the functionality to request assertions from different architectures and translate assertions to be compliant with different architectures. Translated Identity Assertion 1 (236) is sent to Service Provider 3 (210) in compliance with the architecture of Circle of Trust 2 (200).

Figure 3:
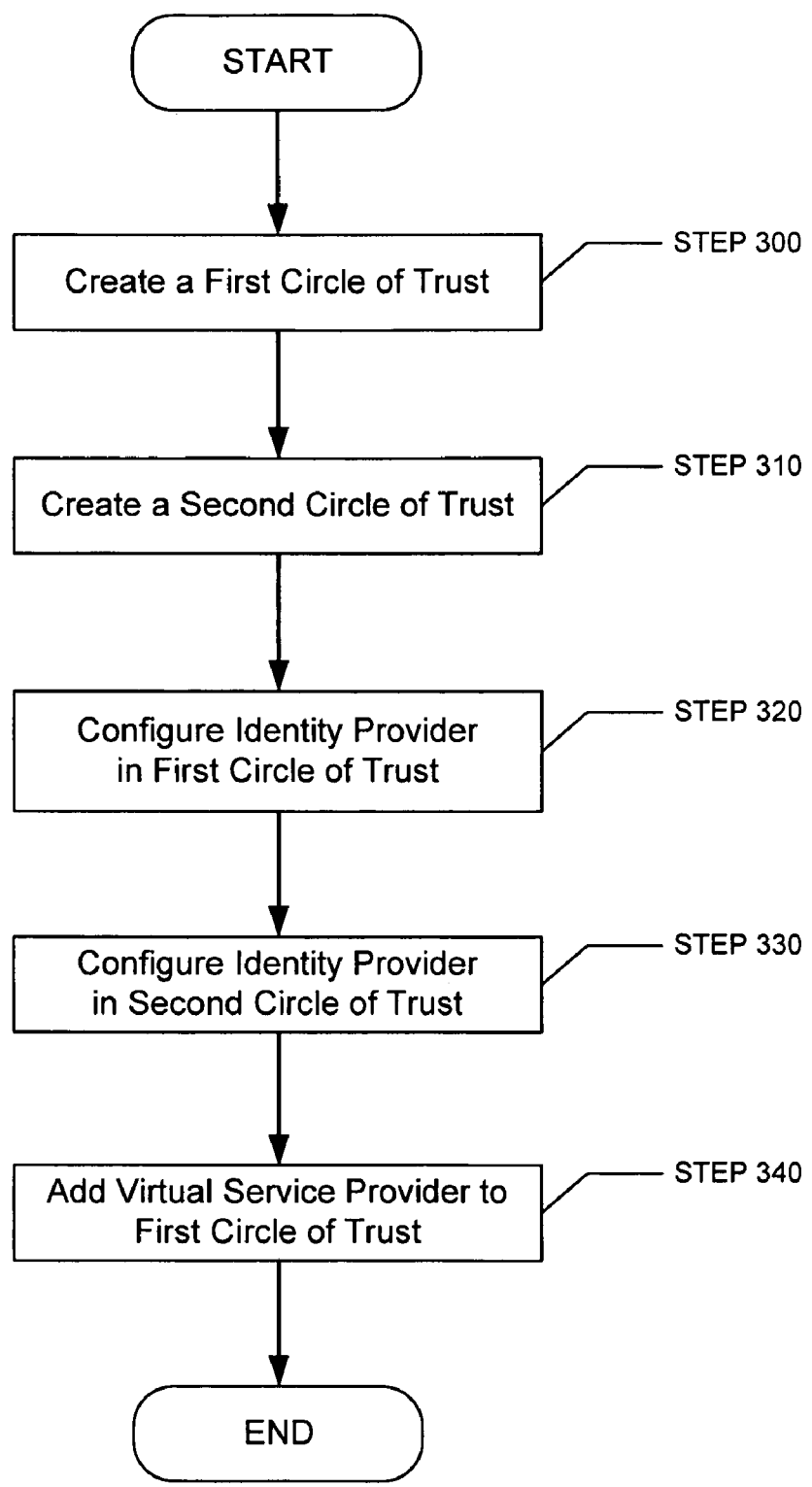
FIGS. 3 and 4 show flow charts in accordance with one embodiment of the invention.

FIG. 3 shows a flow chart in accordance with one embodiment of the invention. In Step 300, a first circle of trust is created. This first circle of trust may be created because a group of companies have established a business relationship. This first circle of trust may include an identity provider and one or more service providers. The identity providers and/or service providers may be servers, mainframes, desktop PCs, etc. The service providers may be connected to the identity provider using a wired or wireless connection or through a wired or wireless network, such as a local area network or the Internet. In Step 310, a second circle of trust is created. The reason for establishing the second circle of trust may be the same as for establishing the first circle of trust (Step 300). This second circle of trust may also include an identity provider and one or more service providers. The construction and connections of the identity provider and the service providers in the second circle of trust may be similar to those of the first circle of trust (Step 300). In Step 320, the identity provider in the first circle of trust is configured to locate the identity provider in the second circle of trust. Further, the identity provider in the first circle of trust is configured to communicate with the identity provider in the second circle of trust as dictated by the architecture of the second circle of trust as described in detail below. Further still, the identity provider of the first circle of trust is configured to include the necessary functionality to translate identity assertions issued by the identity provider of the second circle of trust into identity assertions compliant with (i.e., into a format understood by the service provider in the first circle of trust) the architecture of the first circle of trust.

In Step 330, the identity provider of the second circle of trust is configured in a similar manner to the identity provider in the first circle of trust (Step 320). In one embodiment of the invention, configuring the identity providers (Step 320, Step 330) includes generating a data structure (e.g., a list, table, etc.) in each identity provider to store information about the other identity providers with which the particular identity provider may communicate in order to obtain identity assertions. Finally, in one embodiment of the invention, a virtual service provider is added to the first circle of trust (Step 340).

In one embodiment of the invention, the identity providers are configured to use cookies provided by the principal to locate identity providers in other circles of trust in order to obtain identity assertions associated with the principal. Although only two circles of trust have been established and configured in FIG. 4, one skilled in the art would appreciate any number of circles of trust may be establish and configured in a similar manner.

Figure 4:
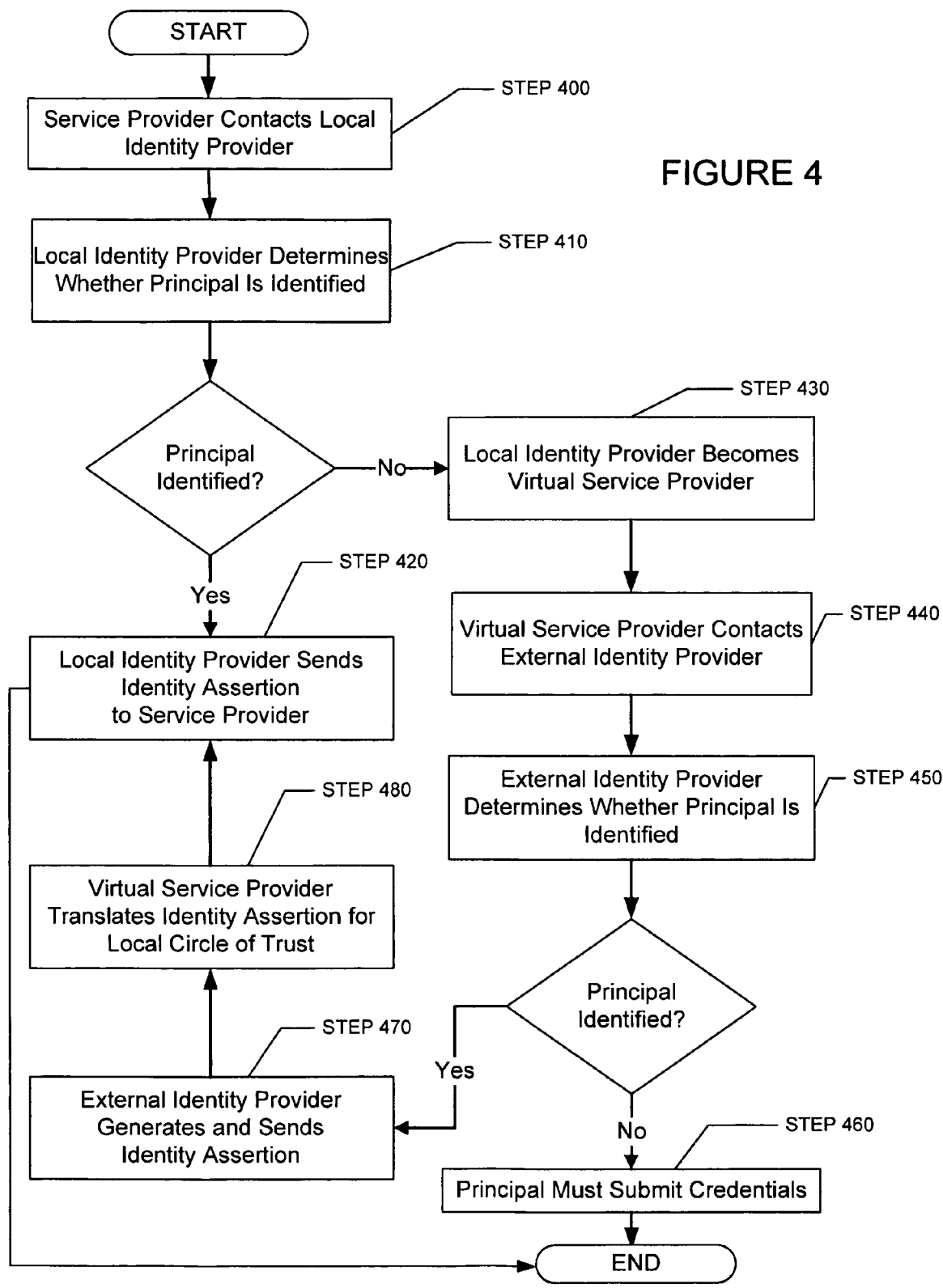

FIG. 4 is a flowchart showing the process of identifying a principal in a second circle of trust in accordance with one or more embodiments of the invention. If a principal navigates from a service provider in a first circle of trust to a service provider in a second circle of trust, the service provider initially contacts the local identity provider (i.e., an identity provider in the second circle of trust) (Step 400). The local identity provider determines whether the principal has been identified in the second circle of trust (Step 410). If the principal has been identified in the second circle of trust, the local identity provider generates an identity assertion (as described in relation to FIG. 1) and sends it to the service provider in the second circle of trust (Step 420).

If the principal has not been identified in the second circle of trust, the local identity provider in the second circle of trust becomes a virtual service provider in the first circle of trust (Step 430). The local identity provider in the second circle of trust, acting as a virtual service provider in the first circle of trust, subsequently contacts the identity provider in the first circle of trust (i.e., the external identity provider) (Step 440). In one embodiment of the invention, contacting the identity provider in the first circle of trust may include generating and sending a request for identification to the identity provider in the first circle of trust, where the request is in compliance with the architecture of the first circle of trust. Those skilled in the art will appreciate that the local identity provider in the second circle of trust includes functionality to locate the local identity provider in the first circle of trust and functionality to communicate with the local identity provider in the first circle of trust. The external identity provider determines if the principal has been identified in the first circle of trust (Step 450). If the principal has not been identified, the principal may submit credentials to the identity provider of the second circle of trust (Step 460). Alternatively, the principal may be prompted to submit credentials to the first circle of trust and then proceed with the remaining steps in the flow chart shown in FIG. 4.

If the principal has been identified in the first circle of trust (or after the principal has successfully logged in to the first circle of trust in some other manner), the external identity provider generates and sends an identity assertion to the virtual service provider (i.e., the identity provider of the second circle of trust) compliant with the architecture the first circle of trust (Step 470). The virtual service provider translates the identity assertion into a translated identity assertion that is understood by the service providers and identity providers in the second circle of trust (i.e., into an identity assertion compliant with the architecture of the second circle of trust) (Step 480). This translated identity assertion is sent to the service provider in the second circle of trust (Step 420).

In one embodiment of the present invention, the identity providers in both circles of trust have a business relationship in order to permit identification in one circle of trust to propagate to the other circle of trust. Those skilled in the art can appreciate many circles of trust may be involved in a business relationship and the local identity provider may contact identity providers in the numerous other circles of trust to verify if the principal is identified.

In one or more embodiments of the invention, each identity provider has information about other identity providers in other circles of trust. In one embodiment of the invention, the information about the other identity providers may correspond to a static or dynamic table stored on each identity provider.

Figure 5:
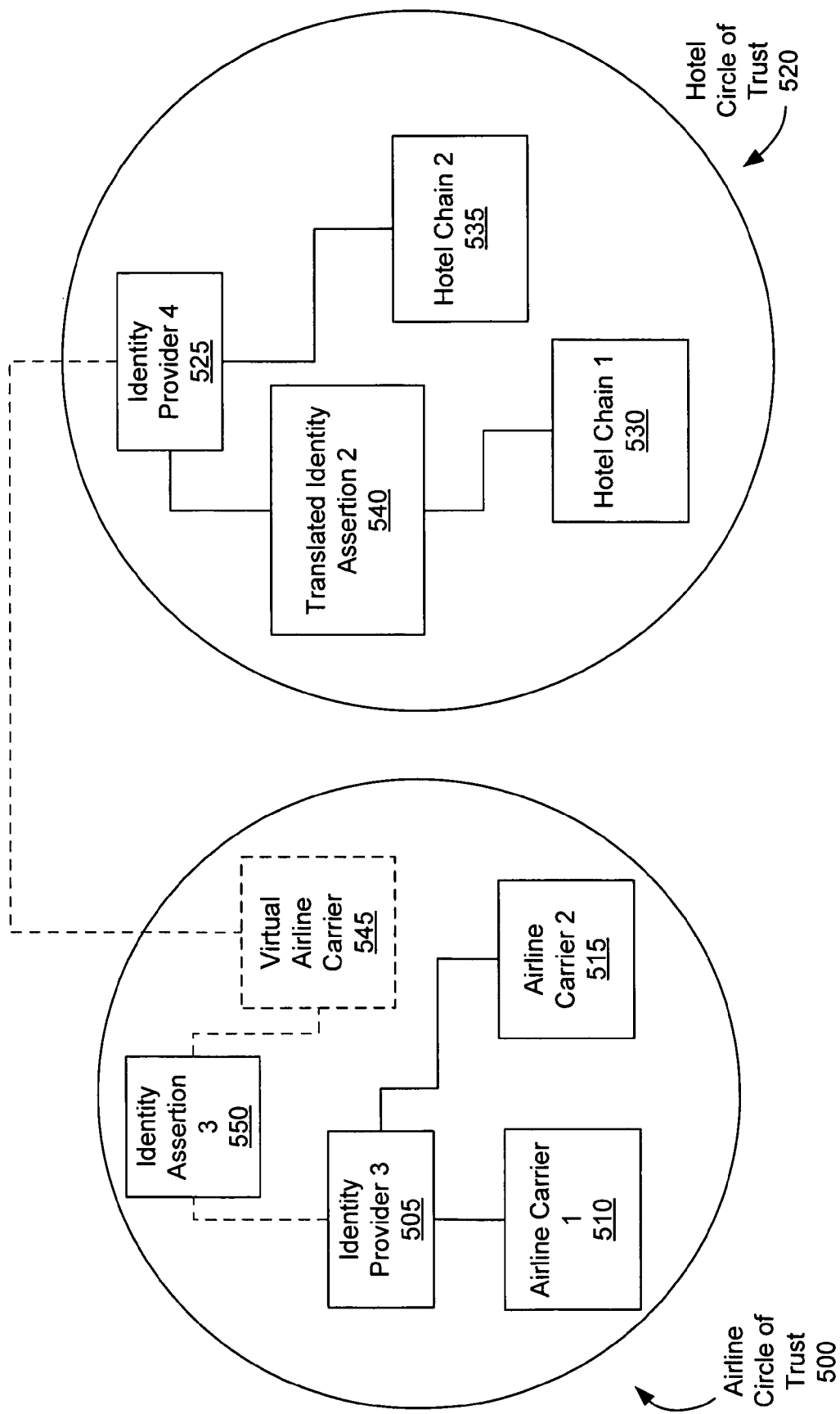
FIGS. 5 and 6 each show systems in accordance with one embodiment of the invention.

FIG. 5 shows a system in accordance with one embodiment of the invention. This example is not meant to limit the invention. FIG. 5 shows two circles of trust (i.e., Airline Circle of Trust (500), Hotel Circle of Trust (520)).

The Airline Circle of Trust (500) is created because a group of commercial airline carriers have established a business relationship, for example, an air travel website. The Airline Circle of Trust (100) has an identity provider (Identity Provider 3 (505)) and two service providers (i.e., Airline Carrier 1 (510), Airline Carrier 2 (515)).

The Hotel Circle of Trust (520) is created because a group of hotel chains have established a business relationship, for example, a lodging website. The Hotel Circle of Trust (520) has an identity provider (Identity Provider 4 (525)) and two service providers (i.e., Hotel Chain 1 (530), Hotel Chain 2 (535)).

The airline carriers (510, 515) and hotel chains (530, 535) have entered a business relationship, for example, a vacation planning website, and have agreed to share identity information between identity providers (505, 525). However, the Airline Circle of Trust (500) and Hotel Circle of Trust (520) do not use the same architecture for federation.

Consider a principal (not shown), who has successfully used a service of Airline Carrier 1 (510) and then proceeds to use a service of Hotel Chain 1 (530). As the principal is not identified in the Hotel Circle of Trust (520), when the principal attempts to use a service of Hotel Chain 1 (530), the principal needs to be identified. Hotel Chain 1 (530) contacts Identity Provider 4 (525) for principal identity information. If Identity Provider 4 (525) has no identity information associated with the principal, Identity Provider 4 (525) requests identity information from Identity Provider 3 (505). Identity Provider 4 (525) must contact Identity Provider 3 (505) in a manner compliant with the architecture of the Airline Circle of Trust (500). Identity Provider 4 (525) may have knowledge of Identity Provider 3 (505) via a static table. Identity Provider 4 (525) appears as a Virtual Airline Carrier (545) when contacting Identity Provider 3 (505). As the principal has recently used a service of Airline Carrier 1 (510) successfully, Identity Provider 3 (505) has identity information associated with the principal. This identity information is forwarded to Identity Provider 4 (525) (appearing as the Virtual Airline Carrier (545)) as Identity Assertion 3 (550). Identity Assertion 3 (550) is forwarded in a manner compliant with the architecture of the Airline Circle of Trust (500). The principal is now identified in the Hotel Circle of Trust (520). Identity Provider 4 (525) translates Identity Assertion 3 (550) into Translated Identity Assertion 2 (540). Translated Identity Assertion 2 (540) is then forwarded to Hotel Chain 1 (530). Translated Identity Assertion 2 (540) is an identity assertion compliant with the architecture of the Hotel Circle of Trust (520). The principal may now use a service of Hotel Chain 1 (530).

Figure 6:
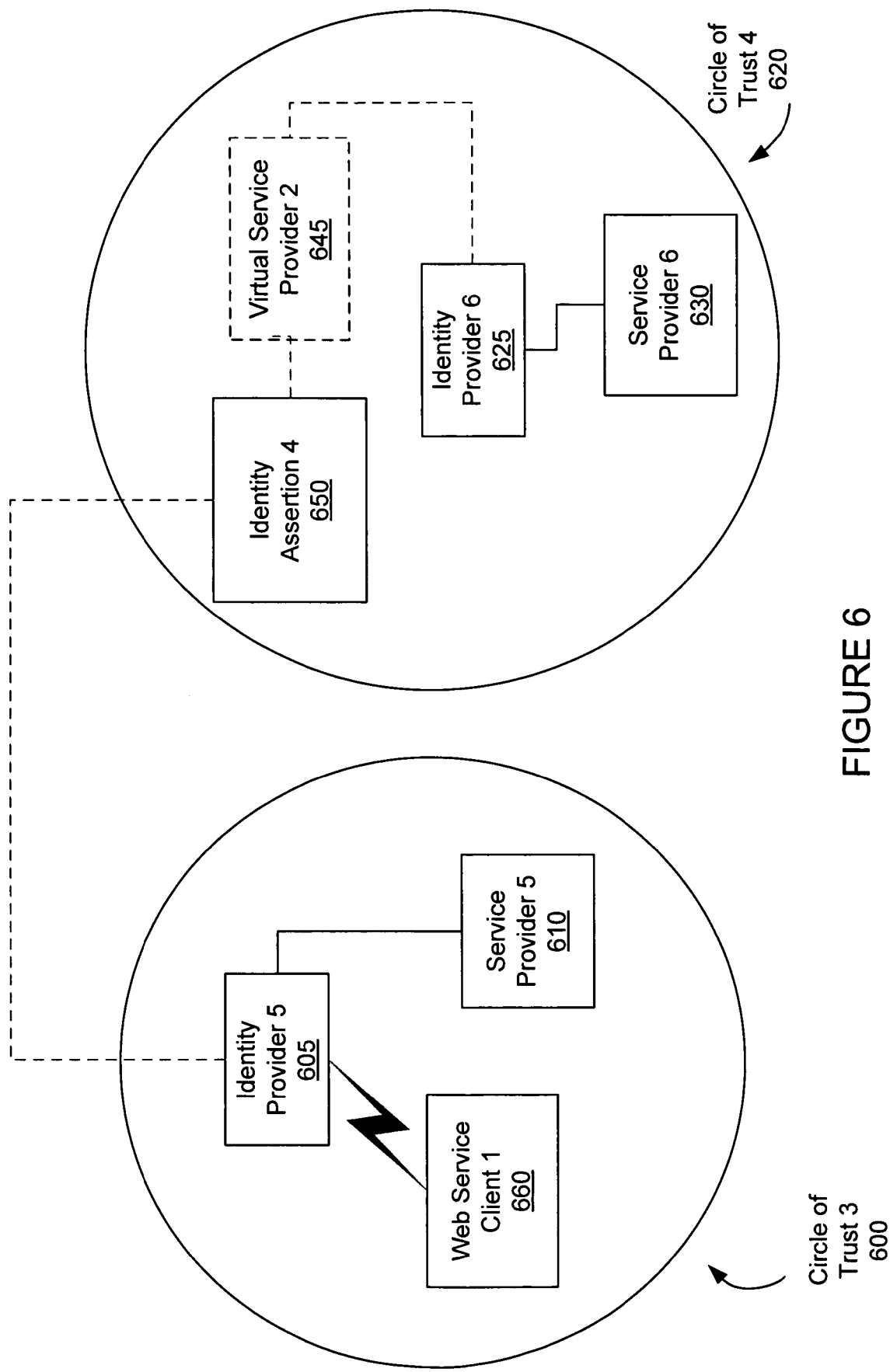

FIG. 6 shows a system in accordance with one embodiment of the invention. This example is not meant to limit the invention. FIG. 6 shows two circles of trust (i.e., Circle of Trust 3 (600), Circle of Trust 4 (620)). Circle of Trust 3 (600) has one identity provider (Identity Provider 5 (605)) and one service provider (Service Provider 5 (610)). Circle of Trust 4 (620) also has one identity provider (Identity Provider 6 (625)) and one service provider (Service Provider 6 (630)). Circle of Trust 3 (600) and Circle of Trust 4 (620) do not use the same architecture for federation. However, Circle of Trust 3 (600) and Circle of Trust 4 (620) have agreed to share identity information between identity providers (605, 625).

Web Service Client 1 (660) is presently identified in Circle of Trust 3 (600). Web Service Client 1 (660) proceeds to access a service of Service Provider 6 (630). Web Service Client 1 (660) presents its identity and the Service Provider it wishes to access (i.e., Service Provider 6 (630)) to Identity Provider 5 (605). Identity Provider 5 (605) translates the access request and contacts Identity Provider 6 (625) in a manner compliant with the architecture of Circle of Trust 4 (620). Identity Provider 5 (605) may have knowledge of Identity Provider 6 (625) via a static table. Identity Provider 5 (605) appears as a virtual service provider (Virtual Service Provider 2 (645)) when contacting Identity Provider 6 (625). Identity Provider 6 (625) will issue an identity assertion (Identity Assertion 4 (650)). Identity Provider 5 (605) will pass Identity Assertion 4 (650) to Web Service Client 1(660). Web Service Client 1 (660) can now access a service of Service Provider 6 (630) using Identity Assertion 4 (650).

In one or more embodiments of the invention, the numerous circles of trust involved in a business relationship form a common domain, and the principal may navigate between circles of trust in the domain with a common domain cookie. The common domain cookie is readable by the identity provider and lists the circles of trust in the common domain previously visited by the principal. The local identity provider can use this list to determine which external identity provider it should contact to identify the principal. In one or more embodiments, the common domain cookie may also included information regarding the architecture of each previously visited circle of trust. Those skilled in the art will appreciate that the aforementioned embodiment may be used without the presence of a common domain.

In one or more embodiments, the invention provides a simple method to propagate identity status between circles of trust and therefore, seamless roaming between the circles of trust. Further, embodiments of the invention require minimal impact on existing architectures and zero impact on the service providers since the changes happen due solely to the effort of the identity providers.

While the invention has been described with respect to a limited number of embodiments, one skilled in the art, having benefit of this disclosure, can appreciate that other embodiments can be devised which do not depart from the scope of the invention as disclosed herein. Accordingly, the scope of the invention should be limited only by the attached claims.

The invention claimed is:

1. A system for identifying a principal in a first circle of trust, comprising:

a service provider within the first circle of trust, wherein the first circle of trust is implemented using a first architecture;

a first identity provider comprising a first computer processor and operatively connected to the service provider in the first circle of trust, wherein the first identity provider is configured to:

receive a request for identity information associated with the principal from the service provider;

determine that no identification exists for the principal within the first circle of trust;

generate a translated identity assertion request by translating the request for identity information to be in compliance with a second architecture;

and a second identity provider, comprising a second computer processor, within a second circle of trust and configured to:

receive the translated identity assertion request from the first identity provider;

generate identity information associated with the principal in response to the translated identity assertion request; and send the identity information associated with the principal to the first identity provider in the first circle of trust, wherein the second circle of trust is implemented using the second architecture, and wherein the first identity provider in the first circle of trust is further configured to translate identity information associated with the principal received from the second identity provider into a format compliant with the first architecture and provide the identity information received from the second identity provider to the service provider.

2. The system of claim 1, wherein the first identity provider discovers the second identity provider using a cookie associated with the principal.

3. The system of claim 1, wherein the first identity provider discovers the second identity provider using a data structure.

4. The system of claim 1, wherein the identity information comprises an identity assertion.

5. The system of claim 1, wherein the principal is a web service.

6. A non-transitory computer readable storage medium comprising software instructions for identifying a principal in a first circle of trust, the software instructions, when executed by a computer processor, comprising functionality to:
  receive, by a first identity provider, a request for identity information associated with the principal from a service provider, wherein the first identity provider and the service provider are within the first circle of trust, and wherein the first circle of trust is implemented using a first architecture;
  determine, by the first identity provider, that no identification exists for the principal within the first circle of trust;
  generate, by the first identity provider, a translated identity assertion request by translating the request for identity information to be in compliance with a second architecture;
  send, by the first identity provider, the translated identity assertion request to a second identity provider in a second circle of trust,
  wherein the second circle of trust is implemented using the second architecture, and
  wherein the second identify provider in the second circle of trust generates identity information associated with the principal in response to the translated identity assertion request and sends the identity information associated with the principal to the first identity provider in the first circle of trust;
  and
  provide, by the first identity provider translated identity information associated with the principal received from the second identity provider into a format compliant with the first architecture, the identity information associated with the principal to the service provider, wherein the identity information is used for granting the principal access to the service provider.

7. The medium of claim 6, wherein the first identity provider corresponds to a virtual service provider in the second circle of trust.

8. The medium of claim 6, wherein the principal is identified in the second circle of trust.

9. The medium of claim 6, further comprising discovering the second identity provider using a cookie associated with the principal.

10. The medium of claim 6, further comprising discovering the second identity provider using a data structure.

11. The medium of claim 6, wherein the identity information comprises an identity assertion.

12. A method for identifying a principal in a first circle of trust, comprising:
  receiving, by a first identity provider comprising a computer processor, a request for identity information associated with the principal from a service provider, wherein the first identity provider and the service provider are within the first circle of trust, and wherein the first circle of trust is implemented using a first architecture;
  determining, by the first identity provider, that no identification exists for the principal within the first circle of trust;
  generating, by the first identity provider and using the computer processor, a translated identity assertion request by translating the request for identity information to be in compliance with a second architecture;
  sending, by the first identity provider and using the computer processor, the translated identity assertion request to a second identity provider in a second circle of trust,
  wherein the second circle of trust is implemented using the second architecture,
  wherein the second circle of trust is separate from the first circle of trust, and
  wherein the second identify provider in the second circle of trust generates identity information associated with the principal in response to the translated identity assertion request and sends the identity information associated with the principal to the first identity provider in the first circle of trust;
  and
  providing, by the first identity provider and using the computer processor translated identity information associated with the principal received from the second identity provider into a format compliant with the first architecture, the identity information associated with the principal to the service provider, wherein the identity information to used for granting the principal access to the service provider in the first circle of trust.

13. The method of claim 12, wherein the identity information comprises an identity assertion.

14. The method of claim 12, wherein the principal is a web service.

15. The method of claim 12, wherein the first identity provider discovers the second identity provider using a cookie associated with the principal.

16. The method of claim 12, wherein the first identity provider corresponds to a virtual service provider in the second circle of trust.

* * * * *